March 19, 1963 J. E. MARTENS 3,081,994
WINDOW ACTUATOR
Filed Sept. 12, 1960 2 Sheets-Sheet 1

INVENTOR.
JACK E. MARTENS
BY W. E. Rechtenwald
P. J. Rose
ATTORNEY

March 19, 1963
J. E. MARTENS
3,081,994
WINDOW ACTUATOR
Filed Sept. 12, 1960
2 Sheets-Sheet 2
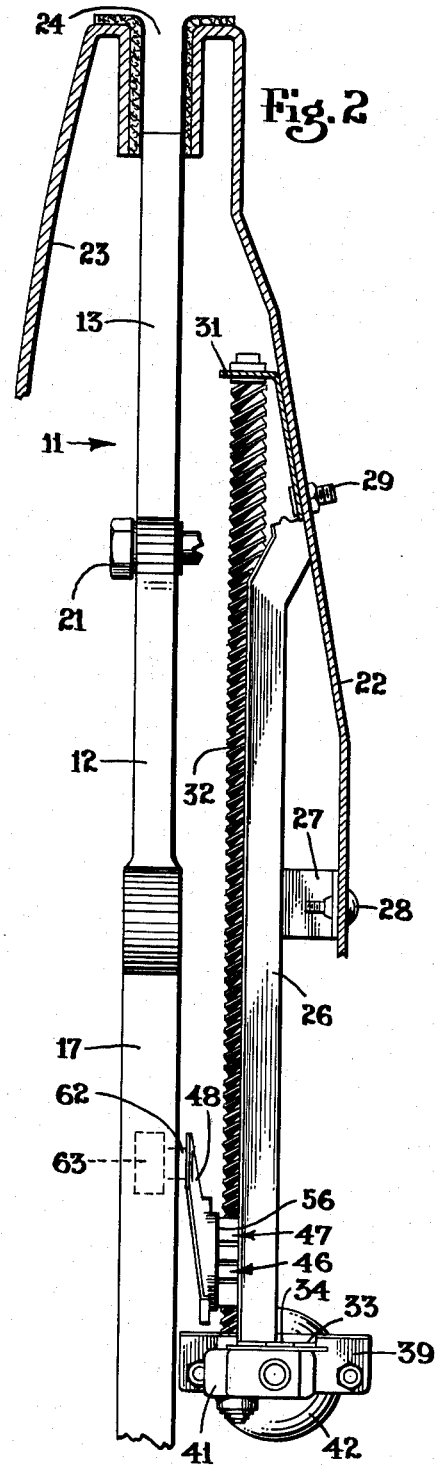
Fig. 2
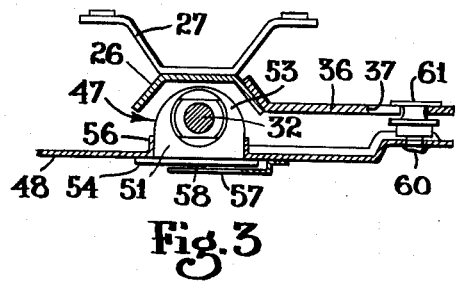
Fig. 3
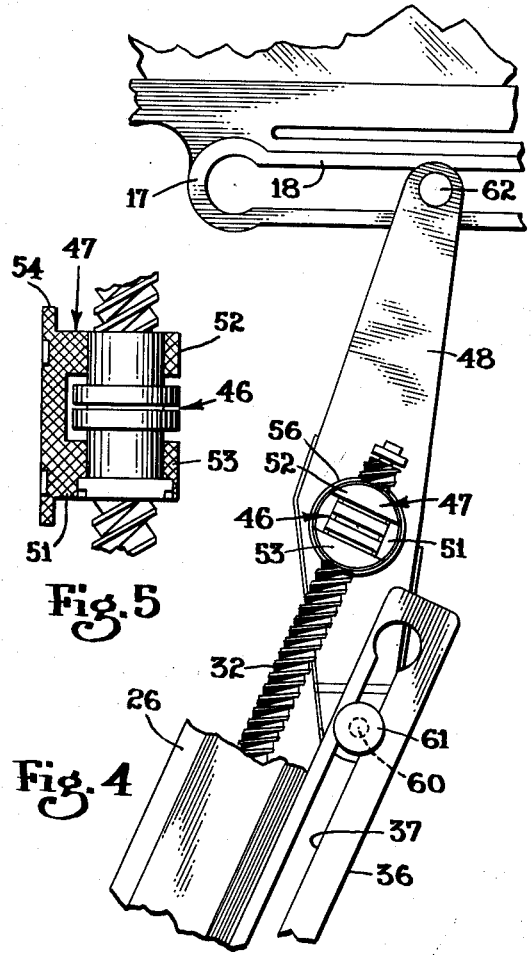
Fig. 5
Fig. 4
INVENTOR.
JACK E. MARTENS
BY W. E. Recktenwald
O. J. Rose
ATTORNEY

United States Patent Office 3,081,994
Patented Mar. 19, 1963

3,081,994
WINDOW ACTUATOR
Jack E. Martens, Gary, Ind., assignor to The Anderson Company, a corporation of Indiana
Filed Sept. 12, 1960, Ser. No. 55,570
4 Claims. (Cl. 268—108)

This invention relates to improvements in window regulators for opening and closing the rear-quarter windows of automobiles.

An object of the invention is to provide an improved window-regulating mechanism for opening and closing pivotally mounted rear-quarter windows of automotive vehicles.

Another object of the invention is to provide a more compact, unitary power means for pivoting rear-quarter windows between open and closed positions.

A further object of the invention is to provide improved means for operatively connecting a power screw with a pivotally mounted rear-quarter window.

Other objects and advantages of the invention will become apparent after the description hereinafter set forth is considered in conjunction with the drawings annexed hereto.

FIGURE 2 is a view taken at a right angle to FIGURE 1 in the direction of arrow 2 in FIGURE 1, showing the screw of my window-regulating mechanism in true length and illustrating portions of the automobile body panels in cross section, an upper portion of the main support member being broken away;

FIGURE 3 is a cross-sectional view taken along line 3—3 of FIGURE 1;

FIGURE 4 is a fragmentary view similar to FIGURE 1, but showing the window in up or closed position; and FIGURE 5 is an enlarged cross-sectional view of the motion-transmitting bracket, also showing the nut member and a portion of the screw.

Figure 1:
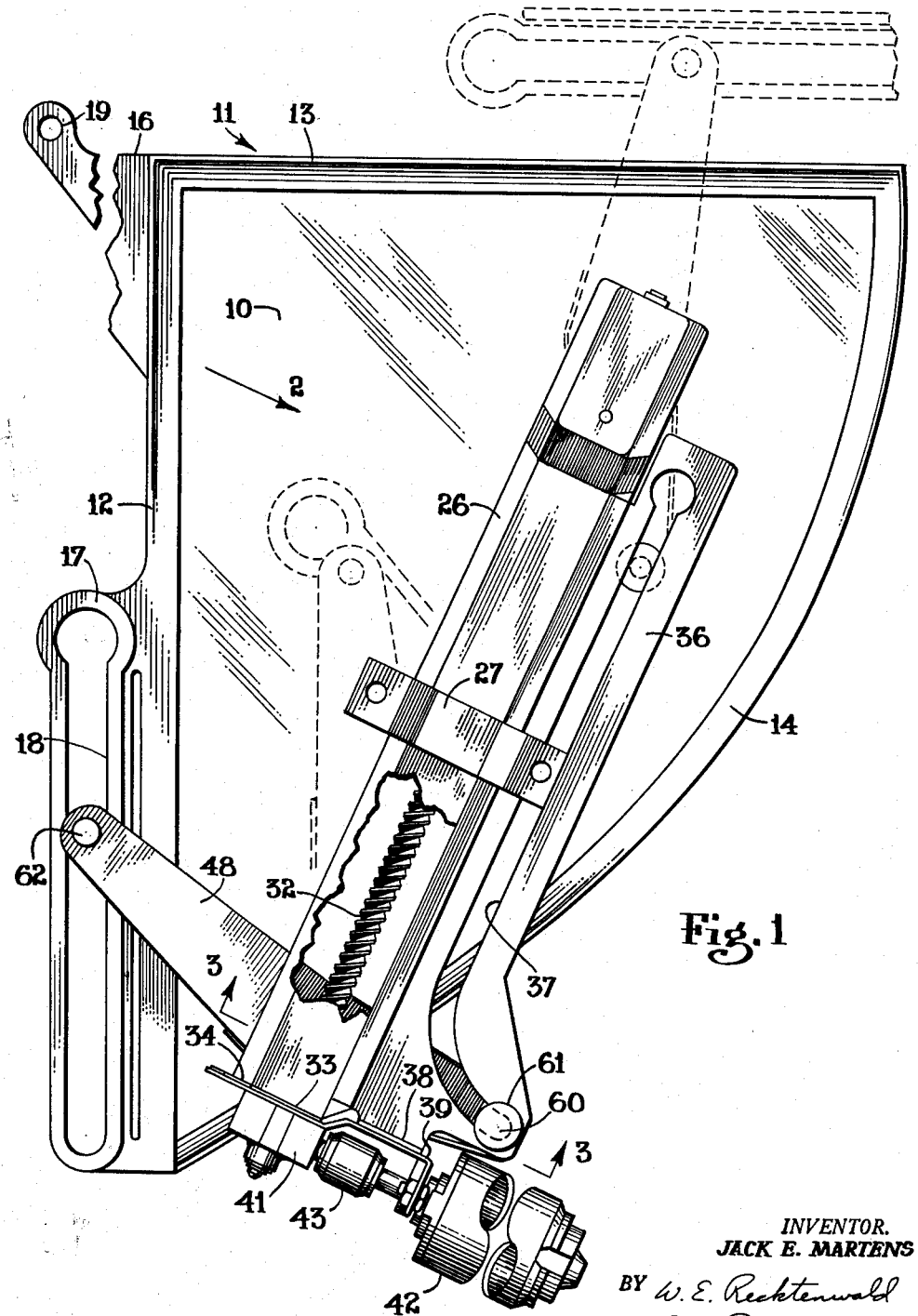
FIGURE 1 is a view in elevation showing a right rear-quarter window in down or open position and showing the window-regulating mechanism of my invention as it would appear from inside the automobile if the inner body panel were removed, a portion of the main support member being broken away.

With reference to the drawings, a rear-quarter window panel of an automobile is indicated in FIGURE 1 by the numeral 10. The window panel 10 is made of glass and is mounted in a frame generally indicated by numeral 11. In accordance with the shape of window panel 10, the frame 11 includes two straight portions 12 and 13 joined at their inner ends and extending at right angles to each other and joined at their outer ends to a curved portion 14. The straight portion 12 includes an anchoring portion 16 and a slotted connecting portion 17 having an elongate slot or track 18 therein. Anchoring portion 16 is provided with an aperture 19 for pivotally mounting the window panel 10 and frame 11 on a pivot stud 21 (FIGURE 2) secured to an inner body panel 22 of an automobile in a suitable manner, as will be understood by those skilled in the art.

The pivot stud 21 appears low in FIGURE 2 because of the angle from which FIGURE 2 is taken. An outer body panel 23 is indicated in FIGURE 2, and it will be evident that window panel 10 and frame 11 are pivotable about stud 21 counterclockwise in FIGURE 1 upwardly and substantially out from between panels 22 and 23 in FIGURE 2 through the aperture 24 between the panels. In the upper or closed position of the window panel 10, portion 12 of frame 11 will extend horizontally between the tops of panels 22 and 23, and portion 13 will extend vertically out of aperture 24, the window being pivotable through substantially ninety degrees of rotation.

The means for pivoting the window will now be described. A main support member 26 is secured to inner body panel 22 between the inner and outer panels. Support member 26 is channel-shaped in cross section, as can be seen in FIGURE 3, and has a mounting bracket 27 welded to a central portion thereof. The opposite ends of bracket 27 are drawn and tapped, and the bracket is secured to inner body panel 22 by a pair of screws 28, one of which can be seen in FIGURE 2. The upper end portion of support member 26 is bent and is secured directly to panel 22 by a bolt 29. The extreme top portion 31 of support member 26 is further bent inwardly to provide means for mounting the upper end of a screw member 32. At the lower end of support member 26, the bottom of the channel and one side thereof are provided with outwardly extending flange portions 33 and 34, respectively, in a manner which will be readily understood.

A guide bracket 36 having a slot 37 or track therein is welded to the other side of the channel of support member 26, as shown in FIGURE 1. The bracket 36 has a flange portion 38 at the lower end thereof spaced from the planes of flange portions 33 and 34. An offset mounting bracket 39 is secured to flange portions 33 and 34 of support member 26 and flange portion 38 of guide bracket 36 in a suitable manner, such as by welding.

A gear-reducing mechanism 41, which includes bearing means for mounting the lower end of screw member 32, is mounted on the underside of bracket 39, while a flange portion of the bracket supports a motor 42 secured thereto. The motor is connected to gear-reducing mechanism 41 through a flexible connector 43.

Cooperating with screw 32 is a nut member 46 having a motion-transmitting bracket 47 mounted thereon. An actuating link 48 pivotally mounted on bracket 47 operatively connects the motion-transmitting bracket with window frame 11.

The motion-transmitting bracket 47 has a circular body portion 51 forming a pivotal mounting means for actuating link 48. Extending from circular body portion 51 are upper and lower nut-holding portions 52 and 53 respectively embracing upper and lower portions of nut member 46. The circular body portion 51 also has a flange 54 at the opposite side thereof from nut-holding portions 52 and 53. The flange 54 retains actuating link 48 on the motion-transmitting bracket 47.

Actuating link 48 is apertured to receive motion-transmitting bracket 47 and has a flange 56 around the aperture forming a bearing for cooperation with circular body portion 51 of motion-transmitting bracket 47. A spring arm 57 is secured to actuating link 48 and is formed with a protuberance 58 which presses against circular body portion 51 to maintain actuating link 48 against flange 54 so that it will not slide inwardly against screw 32.

A stud 60 is riveted to one end of actuating link 48 and is provided with a contoured roller 61 engageable in slot 37 of guide bracket 36. The other end of actuating link 48 is provided with a stud or projection 62 riveted thereto and extending in the opposite direction from stud or projection 60. A contoured roller 63 is mounted on stud 62 for engagement with slot 18 in connecting portion 17 of straight portion 12 of the frame 11.

It is believed that the operation of the device will be readily apparent. Assuming that window panel 10 is in the down or open position of FIGURE 1, energization of motor 42 through a switch (not shown) will cause screw 32 to rotate through the action of flexible connector 43 and gear-reducing mechanism 41. Nut member 46, motion-transmitting bracket 47, and actuating link 48 will thereby be translated upwardly along the screw. Actuating link 48 will pivot on motion-transmitting bracket 47 according to the position of roller 61 in slot 37 of guide bracket 36. Specifically, link 48 will pivot while roller 61 traverses the lower curved portion of slot 37, and after roller 61 reaches the straight portion of slot 37, no more pivoting of link 48 will take place as it is translated along the screw. The controlled movement of link 48 pivots window 10 and frame 11 about pivot stud 21 through the slotted connection therebetween including roller 63 and slot 18. The fully up or closed position of window panel 10 is partially shown in FIGURE 4 and also in dotted lines in FIGURE 1. Operation of the mechanism in the reverse direction will be readily understood.

It will be seen that I have provided a novel mechanism incorporating a nut-and-screw motion-transmitting device for opening and closing a pivoted rear-quarter window.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A window-regulating mechanism for pivoting a rear-quarter window panel of an automobile between open and closed positions comprising a pivotally mounted frame for said window panel, said frame having a slotted connecting portion along an edge thereof, an elongate support member mounted to extend generally parallel to said window panel, a guide bracket secured to said support member, said guide bracket having a curved slot therein, a screw rotatably carried by said support member, a nut mounted on said screw for movement axially thereof upon rotation of said screw, an actuating link pivotally mounted on said nut between said window panel on one side and said support member, screw, and guide bracket on the other side, a first stud secured to said actuating link adjacent one end thereof and projecting into the slot of the slotted connecting portion of said frame, and a second stud secured to said actuating link adjacent the other end thereof and projecting in an opposite direction from said first stud into the curved slot in said guide bracket.

2. A window-regulating mechanism for pivoting a rear-quarter window panel of an automobile between open and closed positions comprising a pivotally mounted frame for said window panel, said frame having a slotted connecting portion along an edge thereof, an elongate support member mounted to extend generally parallel to said window panel, a guide bracket secured to said support member, said guide bracket having a curved slot therein, a screw rotatably carried by said support member, a nut mounted on said screw for movement axially thereof upon rotation of said screw, an actuating link pivotally mounted on said nut between said window panel on one side and said support member, screw, and guide bracket on the other side, a first stud secured to said actuating link adjacent one end thereof and projecting into the slot of the slotted connecting portion of said frame, a second stud secured to said actuating link adjacent the other end thereof and projecting in an opposite direction from said first stud into the curved slot in said guide bracket, and a roller mounted on each of said studs for respective engagement with said frame and guide bracket in the slots thereof.

3. A window-regulating mechanism for pivoting a rear-quarter window panel of an automobile between open and closed positions comprising a pivotally mounted frame for said window panel, said frame having a slotted connecting portion along an edge thereof, an elongate support member mounted to extend generally parallel to said window panel, a guide bracket secured to said support member, said guide bracket having a curved slot therein, a screw rotatably carried by said support member, a nut mounted on said screw for movement axially thereof upon rotation of said screw, an actuating link pivotally mounted on said nut between said window panel on one side and said support member, screw, and guide bracket on the other side, a first stud secured to said actuating link adjacent one end thereof and projecting into the slot of the slotted connecting portion of said frame, a second stud secured to said actuating link adjacent the other end thereof and projecting in an opposite direction from said first stud into the curved slot in said guide bracket, a roller mounted on each of said studs for respective engagement with said frame and guide bracket in the slots thereof, a mounting bracket secured to adjacent ends of said support member and guide bracket, and a motor and gear-reducing mechanism carried by said mounting bracket and operatively connected to said screw.

4. A window-regulating mechanism for pivoting a rear-quarter window panel of an automobile between open and closed positions comprising in combination: a pivotally mounted frame for supporting a window panel, said frame having first track means along one portion thereof, an elongate support member adapted to rotatably carry a screw disposed along an axis generally parallel to the plane of movement of said frame, power means for rotating the screw, an elongate bracket secured to said elongate support member and adapted to lie adjacent thereto, said elongate bracket having second track means thereon, said track defined by a portion extending generally parallel with said screw and a laterally curved portion, a nut mounted on said screw for linear movement therealong upon rotation of said screw, and an actuating link operatively mounted on said nut for movement therewith, said actuating link having portions slidably received on said first and second track means and movable therealong upon rotation of said screw to pivot said window frame from one position to another.

References Cited in the file of this patent
UNITED STATES PATENTS

| | | |
|---|---|---|
| 2,599,744 | Brundage | June 10, 1952 |
| 2,798,719 | Pickles | July 9, 1957 |
| 2,873,612 | Schneidewind | Feb. 17, 1959 |